(No Model.)
G. W. COOK.
TRACK CLEARER.
No. 397,584. Patented Feb. 12, 1889.
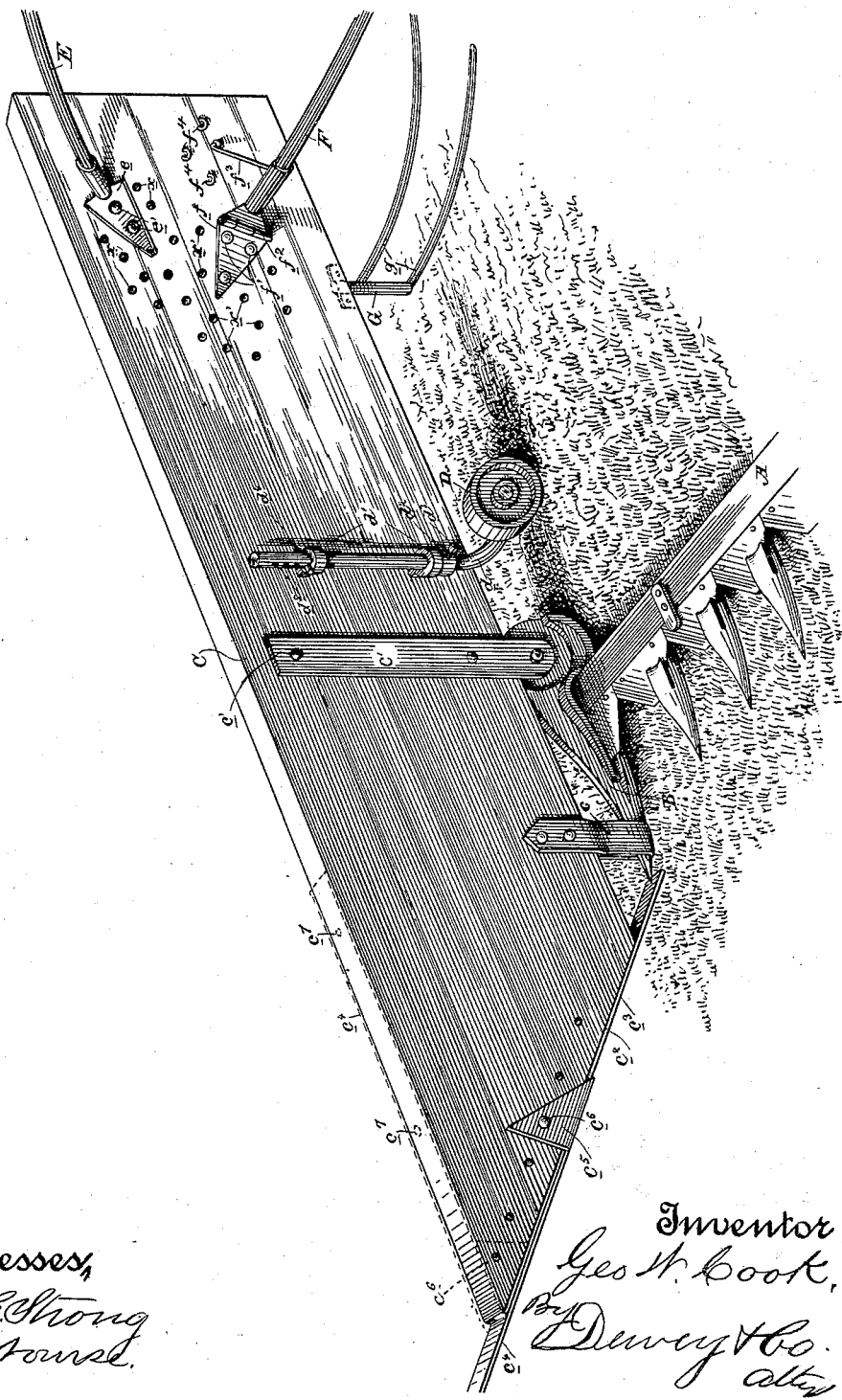
Witnesses,
Geo. H. Strong
J. H. Rouse
Inventor,
Geo. W. Cook,
By Dewey & Co.
Attys

UNITED STATES PATENT OFFICE.

GEORGE WILLIAM COOK, OF MOUNTAIN VIEW, CALIFORNIA.

TRACK-CLEARER.

SPECIFICATION forming part of Letters Patent No. 397,584, dated February 12, 1889.

Application filed March 22, 1888. Serial No. 268,137. (No model.)

*To all whom it may concern:*

Be it known that I, GEORGE WILLIAM COOK, of Mountain View, Santa Clara county, State of California, have invented an Improvement in Swathers; and I hereby declare the following to be a full, clear, and exact description of the same.

My invention relates to the class of swathers the object of which is to prevent the cut grain or grass from falling over onto the standing grain or grass, and to direct it properly into the swath or path of the sickle, thus keeping a clear track.

My invention consists in the construction and combination of devices which I shall hereinafter fully describe and claim.

The object of my invention is to provide a simple, practical, and easily-adjusted swather adapted to be fitted to the shoe of any mower. The particular object of the several improvements will be set forth in the course of the following description.

Referring to the accompanying drawing for a more complete explanation of my invention, the figure is a perspective view of my swather.

A is the outer end of the sickle-bar of a mower, and B is the usual shoe attached thereto.

C is the frame of the swather, consisting of a somewhat elongated strip or piece, which is connected with the shoe by means of a socket-casting, $c$, secured under its forward end, which is adapted to fit over the nose or point of the shoe, and the clip $c'$, bolted to the rear end of the shoe. The forward end of the frame C is beveled or inclined, as shown at $c^2$, from its upper edge downward and backwardly to its lower edge, and this inclined prow or front is preferably protected by means of a face-plate, $c^3$, which, for tall grain, may be provided with a sliding extension-plate, $c^4$, which, when not in use, is adapted to be secured to and to serve as a face-plate for the top edge of the frame, being provided with side guides, $c^5$, embracing the frame, so that it may be readily slipped from one position to another, and when in place secured by bolts or pins $c^6$ $c^7$.

The swather-frame C is provided with a carrying-wheel, D, which has a spindle, $d$, passing loosely up through the bearings $d'$ on the inner surface of the frame, so that the wheel may swivel or turn in any direction and carry the parts at that end of the mower around instead of having to lift the sickle-bar from the ground in turning, as is usually the case. On the stem or spindle of the wheel is fitted a sliding collar, $d^2$, provided with the set-screw $d^3$, whereby it may be fixed in any suitable position, this collar being located under the lower bearing, $d'$. A cross-pin or key, $d^4$, is fitted in any of the series of holes $d^5$ in the top of the spindle above the upper bearing. Now by properly sliding the collar up or down and moving the key the wheel may be raised or lowered, so as to raise or lower the swather-frame and that end of the sickle-bar, so as to regulate, with the assistance of the usual lever at the other end, the height of the cut. This obviates the necessity of using lugs or bearings under the shoe, as is usually done in accomplishing the same purpose.

E is the upper directing-arm of the swather, said arm being extended inwardly toward the machine and provided on its frame end with a head-piece, $e$, which is adapted to be bolted by bolts $e'$ in any of the holes $x$ in the swather-frame, whereby the vertical inclination of the arm may be properly regulated or changed when necessary and its position forward or back accurately determined according to the height of the grain in which the machine is working, as I shall hereinafter explain.

F is the lower directing-arm, also extending inwardly at an angle and provided with a head, $f$, which is adapted to be secured by bolts $f'$ to any of the holes $x'$ in the swather-frame, whereby its vertical position and its position forward or back may be regulated. In addition to these adjustments, the lower directing-arm has an adjustment to or from the frame of the machine, to vary its angle, by reason of the hinged joint $f^2$ in its head $f$, and this latter angle is regulated and controlled by means of the link $f^3$, connected with the arm and adapted to be secured to the frame of the swather in any suitable position by staples $f^4$, or otherwise, in order to hold the arm where adjusted.

The general operation of the swather is well known, and I need herein only describe the objects of the several improvements in my device.

The object of the backward inclination or prow-like front of the frame is to press down clover or any kind of tangled grass onto the guard next to the swather, which conducts it to the knife, so that it is cut off clean up to the standing grass, and the machine may thus take a full cut the next round, which would not be the case were the long branches of clover to project over the cut grass. The object of the extension-plate $c^4$ is to regulate the length of the prow of the swather for different heights. The objects of the carrying-wheel are to make the machine run lighter, to obviate the necessity of lifting the sickle-bar in turning, and to regulate the height of the cut, as described.

The employment of the strip of frame C to form the body of the swather, and the connection of the directing-arms E F therewith in such a manner that their inclination and position fore and aft may be varied and regulated at pleasure, enables me to set these arms in such a position as to accomplish several results. The first of these is that I can so set them that they will not turn the grain or begin to turn it until the sickle has cut far enough in advance to allow the grain just cut to cover up the butts of the grain about to be turned by the arms, so that the last-named grain is held by the grain just cut and has no tendency to slip forward on the ground, but is held so that the top may be turned accurately by the directing-arms. With short grain it is obvious that the directing-arms would be set farther forward on the frame C; but with longer grain they must be set farther back, so that their turning function will not be called into play until the butts of the grain have got far enough behind the sickle to be covered by the grain just cut and held while being turned. Another result is that these directing-arms may be set at any angle up or down, according to the height of the grain and according to the wind, so as to properly turn the grain. The hinged adjustment of the lower directing-arm, which enables it to move closer in or farther out, enables me to properly set it for windy weather or for grain when it is so long that it needs more positive direction, for by setting the arm farther in it is obvious that, in connection with the upper arm, it would overcome the outward tendency, due to the height of the grain or to the wind, and direct it inwardly into the swath.

For clover and other low grass, the directing-arms E F may be either removed or allowed to remain idle; but to the outer side of the frame C, I attach rigidly, in any suitable manner, the downwardly-extending shank, G, which carries the curved directing-arms $g$, extending under the frame of the swather and between its lower edge and the ground and inwardly into the swath. These arms direct the low grass into the swath and away from the standing grass.

Having thus described my invention, what I claim as new, and desire to secure by Letters Patent, is—

1. The frame-strip C of the swather, having the prow-like front, in combination with the sliding extension-plate $c^4$ on said front, whereby said front may be extended as to height, substantially as herein described.

2. The frame-strip C of the swather, having an inclined prow-like front provided with a face-plate, in combination with a sliding extension-plate fitted by a side guide to said prow-like front of the frame, and adapted, also, when not in use to be turned over and serve as a face-plate for the top of the frame-strip, substantially as herein described.

3. In a swather and in combination with its frame-strip having perforations, an inclined directing arm or arms having a head-piece, and the bolts for securing the head-piece of said arm or arms forward or back on the frame of the swather and changing their vertical inclination, substantially as herein described.

4. In a swather and in combination with the swather-frame strip having a series of adjusting-holes, a directing-arm, a head hinged thereto, and bolts passing through said head and into the adjusting-holes, whereby the arm is secured to the frame-strip and its inclination to the frame-strip varied, and means to secure said arm in its inclination, substantially as herein described.

5. In a swather and in combination with the frame having perforations, the inclined directing-arm F, having a head, bolts to enter said perforations, by which said head is secured in different positions on the frame, and the head hinged to said arm, whereby said arm may be moved forward or back, according to the position of the head, and means to secure said arm in its adjustment, substantially as herein described.

6. In a swather and in combination with the frame-strip having perforations, the upper arm, E, having a fixed head, and bolts passing into said perforations and adjustably securing the head, a lower directing-arm having a head hinged thereto, bolts adapted to adjustably secure the head, and means for securing said lower arm after the adjustment of its head, substantially as herein described.

In witness whereof I have hereunto set my hand.

GEORGE WILLIAM COOK.

Witnesses:
  STEPHEN H. CLARK,
  HENRY CARLIN.